US009357049B2

(12) United States Patent
Han

(10) Patent No.: US 9,357,049 B2
(45) Date of Patent: May 31, 2016

(54) METHOD OF OPERATING CAMERA INCLUDING INFORMATION SUPPLEMENT FUNCTION AND TERMINAL SUPPORTING THE SAME

(71) Applicant: Samsung Electronics Co. Ltd., Suwon-si, Gyeonggi-do (KR)

(72) Inventor: Jaebyeong Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 13/667,514

(22) Filed: Nov. 2, 2012

(65) Prior Publication Data

US 2013/0120631 A1 May 16, 2013

(30) Foreign Application Priority Data

Nov. 15, 2011 (KR) ........................ 10-2011-0118789

(51) Int. Cl.
*H04N 5/222* (2006.01)
*H04N 5/76* (2006.01)
*H04M 1/725* (2006.01)
*H04N 5/232* (2006.01)

(52) U.S. Cl.
CPC ....... *H04M 1/72522* (2013.01); *H04N 5/23216* (2013.01); *H04N 5/23293* (2013.01); *H04M 2250/22* (2013.01); *H04M 2250/52* (2013.01)

(58) Field of Classification Search
CPC ............ H04N 1/32128; H04N 9/8205; H04N 2201/3214; H04N 2201/3215; H04N 5/765; H04N 5/23293; H04N 5/772; H04N 5/232; H04N 2101/00; H04N 1/2112
USPC .................. 348/231.3, 231.5, 333.12, 333.02
See application file for complete search history.

(56) References Cited

U.S. PATENT DOCUMENTS

2010/0053342 A1* 3/2010 Hwang et al. ............ 348/207.99

FOREIGN PATENT DOCUMENTS

KR 10-2009-0059516 A 6/2009
KR 10-2009-0076644 A 7/2009

* cited by examiner

*Primary Examiner* — Sinh Tran
*Assistant Examiner* — Selam T Gebriel
(74) *Attorney, Agent, or Firm* — Jefferson IP Law, LLP

(57) ABSTRACT

A method of operating a camera including an information supplement function which supports to write a specific type of information desired by a user during a camera operation, and a terminal for supporting the same are provided. The method includes activating the camera module, and outputting to a display unit, an information editing area having an information supplement function together with at least one of a preview area for outputting the preview image, a photographed image area according to completion of photographing, and an on-photographing area according to a state of on-photographing of at least one of time points when a preview image of an object for photographing at least one of a picture and a moving picture by the activated camera module is output, when a photographing for one of a picture and a moving picture is complete, and when a moving picture is being photographed.

18 Claims, 7 Drawing Sheets

METHOD OF OPERATING CAMERA INCLUDING INFORMATION SUPPLEMENT FUNCTION AND TERMINAL SUPPORTING THE SAME

PRIORITY

This application claims the benefit under 35 U.S.C. §119 (a) of a Korean patent application filed on Nov. 15, 2011 in the Korean Intellectual Property Office and assigned Serial No. 10-2011-0118789, the entire disclosure of which is hereby incorporated by reference.

BACKGROUND OF THE INVENTION

1. Field of the Invention

The present invention relates to a camera operation. More particularly, the present invention relates to a method of operating a camera including an information supplement function which supports to write a specific type of information desired by a user during a camera operation, and a terminal for supporting the same.

2. Description of the Related Art

Although a portable terminal is small enough to be portable, the portable terminal supports a specific user function. For this reason, the portable terminal is in the spotlight in many fields of industry and living. Consequently, in recent years, a portable terminal that integrally supports various user functions has been developed. For example, a camera module is mounted on a prior portable terminal, which supports functions of collecting an image of an object, storing a collected image, and searching for a stored image. Such a portable terminal may support functions of photographing a still picture and a moving picture.

However, the image collecting function supported by a prior portable terminal on which a camera module is mounted simply supports to write image information about an object and information about time when a corresponding image is photographed. Accordingly, a user may recall when and where a picture had been photographed in a situation based on date information in a procedure of searching for stored pictures. However, it is not enough to recall memories about a picture which is searched for based only on the date information. In other words, the date information may be insufficient for a user to recall memories about a picture. Thus, there have been often caused errors in case of old pictures and a specific object (e.g., nature such as a mountain, a river, and the like), that a user could not exactly remember which situation and environment the corresponding pictures had been photographed in. Thus, there is a need for a technique of more clearly recognizing a collected image or more easily and conveniently performing a supplement of additional information about a collected image.

Therefore, a need exists for an apparatus and a method for more easily and quickly performing a writing of a type of information desired by a user while operating a camera module.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of operating a camera which can more easily and fast perform a writing of a type of information desired by a user while operating a camera module, and a terminal of supporting the same.

In accordance with an aspect of the present invention, a method of operating a camera module is provided. The method includes activating the camera module, and outputting to a display unit, an information editing area having an information supplement function together with at least one of a preview area for outputting the preview image, a photographed image area according to completion of photographing, and an on-photographing area according to a state of on-photographing of at least one of time points when a preview image of an object for photographing at least one of a picture and a moving picture by the activated camera module is output, when a photographing for one of a picture and a moving picture is complete, and when a moving picture is being photographed.

In accordance with another aspect of the present invention, a terminal for supporting an information supplement function while operating a camera module is provided. The terminal includes the camera module for supporting to photograph a picture or a moving picture, a display unit for outputting an information editing area having an information supplement function together with at least one of a preview area for outputting the preview image, a photographed image area according to completion of photographing, and an on-photographing area according to a state of on-photographing of at least one of time points when a preview image of an object for photographing at least one of a picture and a moving picture by the activated camera module is output, when a photographing for one a picture and a moving picture is complete, and when a moving picture is being photographed, and a controller for simultaneously outputting the information editing area together with at least one of the preview area, the on-photographing area and the photographed image area, and for supporting to write information in the information editing area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
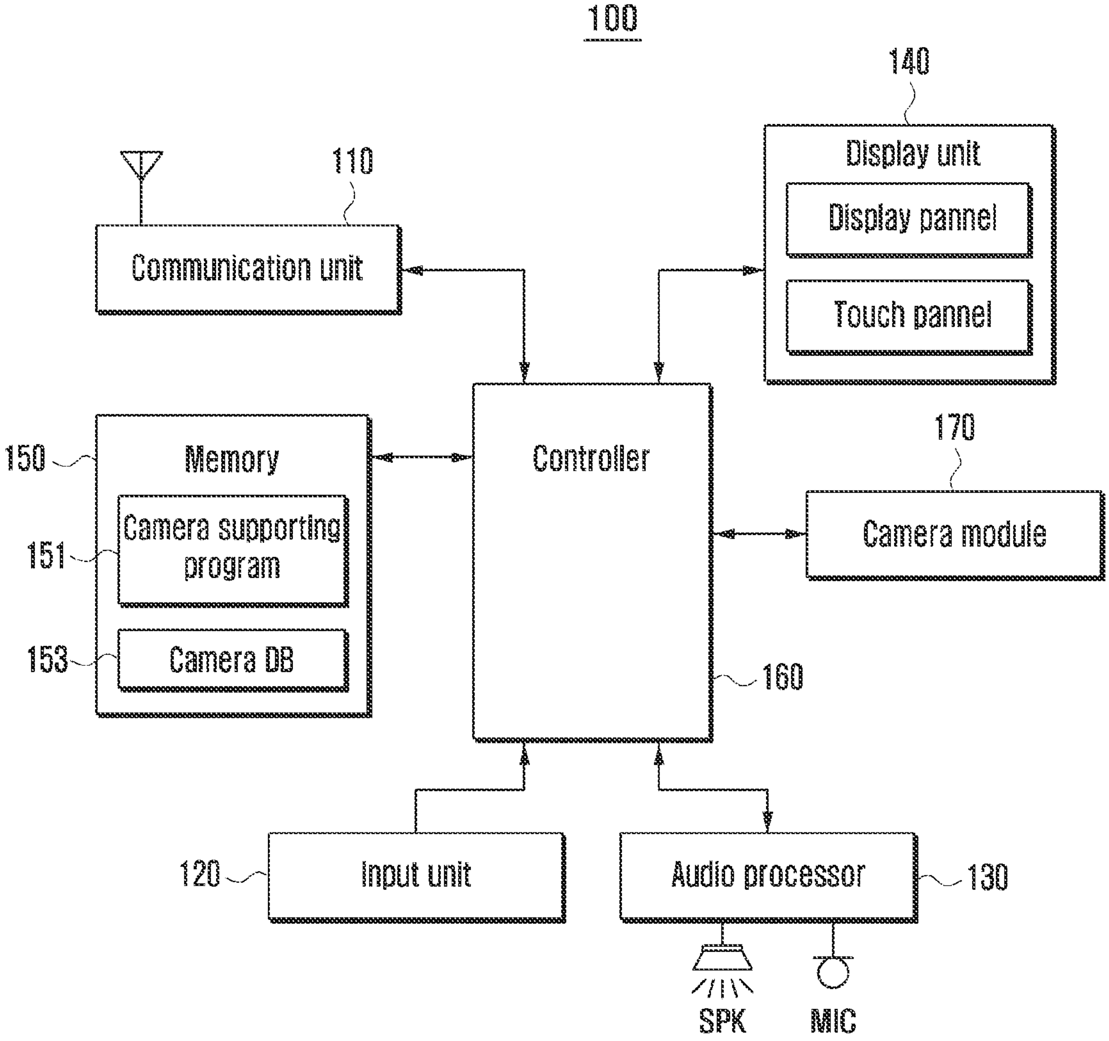
FIG. 1 is a block diagram schematically illustrating a configuration of a terminal 100 which includes an information supplement function according to an exemplary embodiment of the present invention.

FIG. 1 is a block diagram schematically illustrating a configuration of a terminal which supports an information supplement function according to an exemplary embodiment of the present invention.

Referring to FIG. 1, a terminal 100 may include a communication unit 110, an input unit 120, a display unit 140, a memory 150, a camera module 170, and a controller 160. Further, the terminal 100 may include a sensor for detecting whether a state of the terminal 100 is in a landscape mode or a portrait mode. As an example, the sensor for detecting whether a state of the terminal 100 is in a landscape mode or a portrait mode may be an acceleration sensor, a gyro sensor, and the like.

According to exemplary embodiments of the present invention, the terminal 100 having the above configuration may support to output a picture corresponding to an information supplement function according to an input signal input from at least one of the input unit 120 and the display unit 140 for further supporting an input function while the camera module 170 is operated, together with a picture for operating the camera module 170. Thus, when the terminal is in a state in which the camera module 170 is activated, a user may more easily and quickly input various information before and after photographing a specific image or during a photographing of the specific image. According to exemplary embodiments of the present invention, when the terminal 100 supports only a function of operating the camera module 170, a configuration of the communication unit 110 may be omitted. According to other exemplary embodiments, although the communication unit 110 is added to the function of operating the camera module 170, the camera module 170 may support a specific user function in connection with a data transmitting and receiving function based on the corresponding configuration of the communication unit 110.

When the terminal 100 is manufactured in a type of a terminal that supports a communication function, the communication unit 110 is an element which may be added. Thus, according to an exemplary embodiment of the present invention when the terminal 100 does not support the communication function, the communication unit 110 may be omitted from the configuration of the terminal 100. Meanwhile, the communication unit 110 may be provided in a type of mobile communication module for supporting a communication function and more specifically, a mobile communication function of the terminal 100. The communication unit 110 forms a communication channel with a mobile communication system, and supports signal transmission and reception for performing the mobile communication of the terminal 100. For example, the communication unit 110 may form at least one of a voice service channel, a video service channel and a data service channel, and may support transmission and reception of a specific signal according to a corresponding service channel. Specifically, according to exemplary embodiments of the present invention the communication unit 110 may support signal transmission and reception according to operation of the camera module 170. For example, the camera module 170 may be activated for operating the video service channel, and at this time, the communication unit 110 may perform a function of transmitting images collected by the camera module 170 to another terminal or the like. And, the communication unit 110 may support to transmit at least one of still pictures or moving pictures collected by the camera module 170 through the service channel to another terminal. At this time, the communication unit 110 may transmit data of at least one of still pictures and moving pictures in which specific information is written according to the information supplement function.

The input unit 120 is a structural element for generating various input signal necessary for operating the terminal 100. The input unit 120 may be configured by various input means such as a keyboard, a keypad, a key button, and the like according to whether the input unit 120 is compatible with the terminal 100. Further, when the display unit 140 is provided as a touch screen, the input unit 120 is configured in a type of touch map output on the touch screen. The input unit 120 may generate various input signals for supporting the information supplement function. For example, the input unit 120 may generate input signal for activating the camera module 170, for calling the information supplement function in the state where the camera module 170 is activated, for writing specific information on an information editor according to the calling of the information supplement function, and for completing the information supplement function according to user control. Further, the input unit 120 may generate input signals or the like for performing a search, deleting, correction and transmission of an information written image according to user control. Each of the generated input signals may be transferred to the controller 160, changed into instruction words for supporting a user function according to a corresponding input signal, and used.

The audio processor 130 may output various audio data set during a procedure of operating the terminal 100, audio data by reproducing an audio file stored in the memory 150, audio data received from an external and the like. Further, the audio processor 130 may support an audio data collecting function. To do this, the audio processor 130 may include a speaker SPY and a microphone MIC. Specifically, the audio processor 130 supports an output of an effect sound and a guide sound set in a procedure of operating a camera having the information supplement function. Further, the audio processor 130 supports an output of an effect sound and a guide sound set in procedures of searching for, deleting, transmitting an image to which information is written, or the like. Such an effect or guide sound outputting function may be omitted according to a setting by a user or intention of a designer.

The display unit 140 is configured to provide various picture interfaces necessary for operating the terminal 100. For example, the display unit 140 supports a standby picture, a menu picture, and the like. Specifically, the display unit 140 may output a picture according to an operating of the camera module 170, a picture for supporting the information supplement function of pictures for operating the camera module 170, and a picture for performing at least one of functions of searching for, correcting, deleting and transmitting an image to which information is written.

The display unit 140 may be provided in a type of touch screen which superimposes a display panel and a touch panel. Images and texts corresponding to the above-mentioned various pictures may be output to the display panel. The touch panel may be divided into a touch valid area and a touch invalid area according to characteristic of pictures output to the display panel, and transfer a touch event generated from the touch valid area to the controller 160. Specifically, the touch panel may set a preview picture area for an object as the touch invalid area according an operation of the camera module 170, and set an information editing area for supporting the information supplement function as the touch valid area. Thus, confirming a preview image for an object, a user may performs a touch operation for writing schedule information in the information editing area. Pictures for operating the camera module 170 and supporting the information supplement function which are output through the display unit 140 will be described in detail with reference to drawings described below.

The memory 10 may store various basic operating systems, various application programs and algorithms necessary for operating the terminal 100. Specifically, the memory 150 may store a camera supporting program 151 for operating the camera module 170 having the information supplement program 151, and a camera DB 153 including various images collected according to the operation of the camera supporting program 151.

The camera supporting program 151 is a program for supporting an operation of the camera module 170 including the information supplement function of the present invention. When an input signal for activating the camera module 170 by a user is generated, the camera supporting program 151 may be loaded into the controller 160 to support to perform an image photographing operation of the information supplement function. To do this, the camera supporting program 151 may include a routine for providing a preview image of an object, an information editor supporting routine for supporting the information supplement function, a routine for adjusting a preview image and an editor picture and for outputting the preview image on one display unit 140, and a routine for adjusting sizes of the information editor picture and the preview image according to an input signal. Further, the camera supporting program 151 may include a routine for supporting to search for, correct and delete an image stored in the camera DB 153, a routine for distinguishing an image of the stored image in which information is written from other images and providing it, a routine for providing written information and a collected image as an image at photographing it when selecting an image in which the information is written, and a routine for providing one of written information and collected images according to an input signal to a full screen. According to exemplary embodiments of the present invention, the camera supporting program 151 may support a function of collecting an image in which information is written and a function of searching for, correcting, and deleting the image in which the information is written based on each routine described above.

The camera DB 153 is configured to store various images collected according to an operation of the camera module 170. This camera DB 153 may store images having at least one of types of still picture and moving picture. Further, the camera DB 153 may store at least one of types of still picture and moving picture to which information is individually written. According to exemplary embodiments of the present invention, the information editor for supporting the information supplement function may be output according to a user call before the camera module 170 photographs a still picture or a moving picture. Further, the information editor may be output after the camera module 170 photographs a still picture or a moving picture and before it stores the photographed them. According to an exemplary embodiment of the present invention, if the camera module 170 is being used to photograph a moving picture, then the information editor may be output during the photographing of the moving picture.

Thus, although the camera DB 153 may store a still picture in a complex type of information and the still picture, a moving picture may be stored together with information about a time when written information is output. For example, when before photographing a picture and a moving picture or after the photographing, the picture and the moving picture are stored in the camera DB 153, a picture in which information is written before outputting a picture in searching for a corresponding picture and moving picture and reproducing a moving picture, or after the outputting and reproducing. When a moving picture to which information is written during photographing the moving picture is stored in the camera DB 153, the picture to which the information is written may be output at a time point when the information is written to the picture, while reproducing the moving picture in searching for the moving picture. At this time, the information written picture may be output in a predetermined area through a moving picture reproducing picture and a picture division or in a full screen. Further, the information written picture may be output and overlaid in a predetermined area of at least one side of a moving picture reproducing picture which is assigned.

To support a function of writing information to a picture according to an exemplary embodiment of the present invention, the controller 160 is configured to control various signal flow, an information collection and output. The controller 160 supports an image collecting function and an information edit function for supporting to write information to a picture, and the controller 160 supports to complexly operate the two functions. To do this, the controller 160 may include the configuration depicted in FIG. 2.

Figure 2:
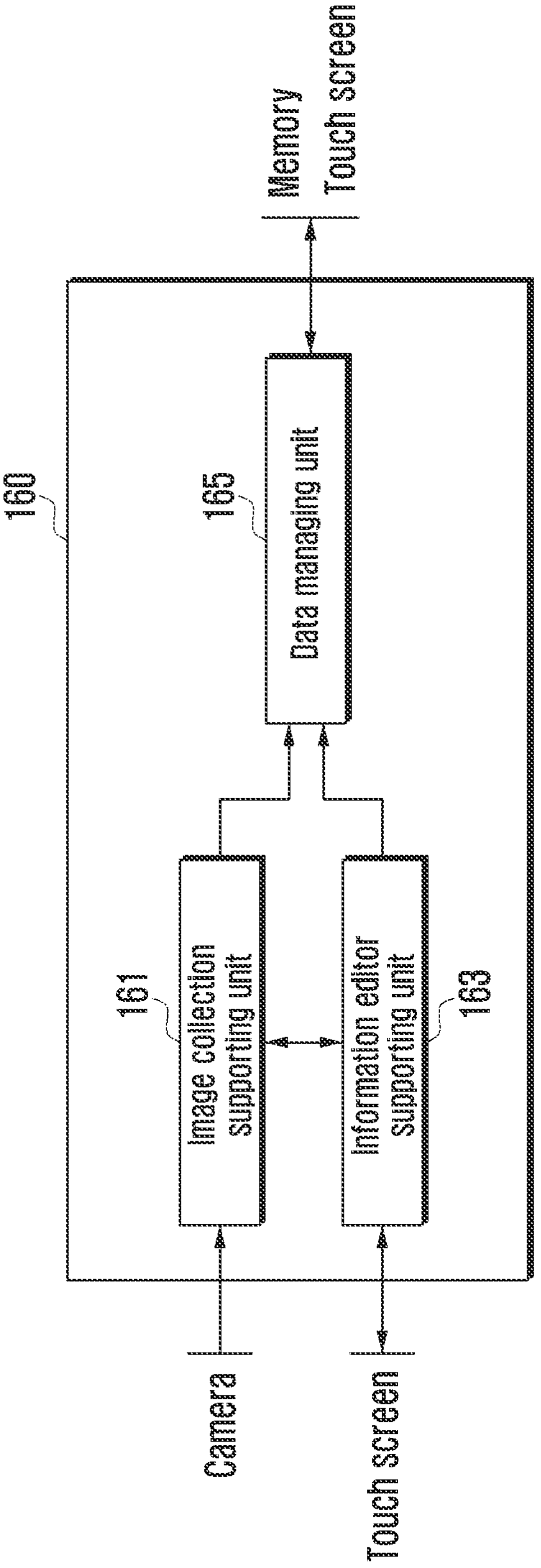
FIG. 2 is a block diagram illustrating a configuration of a controller of a terminal such as, for example, the controller depicted in FIG. 1, in more detail according to an exemplary embodiment of the present invention.

FIG. 2 is a block diagram illustrating in detail a configuration of a controller such as, for example, the controller 160 depicted in FIG. 1, in more detail according to an exemplary embodiment of the present invention.

Referring to FIG. 2, the controller 160 may include an image collection supporting unit 161, an information editor supporting unit 163, and a data managing unit 165.

The image collection supporting unit 161 is configured to support an image collection according to an operation of the camera module 170. When an input signal for activating the camera module 170 is generated from the input unit 120 and the display unit 140 for supporting the touch function, the image collection supporting unit 161 may supply an electric power to the camera module 170 and support to perform an initiating procedure for operating the camera module 170. When the initiation of the camera module 170 is completed, the image collection supporting unit 161 may support to output a preview image of an object incident through a lens. And, when the information supplement function is called, the image collection supporting unit 161 may transfer the preview image to the information editor supporting unit 163. To do this, the image collection supporting unit 161 may provide a menu for calling the information supplement function. According to exemplary embodiments of the present invention, when the information supplement function is provided as a default function, the menu may be omitted.

The information editor supporting unit 163 is configured to support to output the information editor to the display unit 140 according to the activating of the image collection supporting unit 161 and the call of the information supplement function. That is, the information editor supporting unit 163 may support to output the information editor to the display unit 140 according to a request of the image collection supporting unit 161. At this time, the information editor supporting unit 163 may negotiate with the image collection supporting unit 161 about the screen dividing procedure or the predetermined area assigning procedure for the overlaying of the display unit 140, and output the information editor on the divided and assigned screen. Further, while the information editor is output to the display unit 140, the information collection supporting unit 161 may negotiate with the information editor supporting unit 163 about the screen division and the area assignment, and support to output a preview image to the divided screen or the assigned area. When an input signal is generated to output the information editor in the full-screen type from the input unit 120 and the display unit 140 of the touch function, the information editor supporting unit 163 may support to output a picture corresponding to the information editor to the whole of the display unit 140. As an example, the information editor described above may basically support a drawing function. That is, the information editor may support a preceding output according to a touch event generated on the screen. And, after performing character recognition with respect to a line output in a specific type, the information editor may support a character output corresponding to the corresponding line.

Further, the information editor supporting unit 163 may support to output the information editor of a type of a character editor including a key map for a character editing according to a default or user request. Thus, the user may perform a specific character input operating the character editor. In addition, the information editor supporting unit 163 may collect time information about a time point when information has been edited using a counter built in the terminal 100, and control to automatically write the corresponding time information to a corresponding information written picture. The information editing picture described above will be described in detail with reference to FIGS. 3 to 5.

The data managing unit 165 is configured to integrally manage information input from the image collection supporting unit 161 and the information editing supporting unit 163. That is, when an image is transferred from the image collection supporting unit 161 to the data managing unit 165, the data managing unit 165 controls such that the corresponding image is stored in the camera DB 153. Further, when an image is transferred from the image collection supporting unit 161 and written information is transferred from the information editing supporting unit 163 to the data managing unit 165, after integrating the corresponding information and the image into one file, the data managing unit 165 may support to store the file in the camera DB 153. In the procedure of integrating the information and the image, the data managing unit 165 may generate another file according to a time point of collecting the information and a type of the image. For example, when the transferred image is a moving picture, the data managing unit 165 may control such that the transferred information which is matched onto a time point of the moving picture such as a time point just before reproducing the moving picture, a time point just before completing the reproduction of the moving picture, a time point while the moving picture is reproduced and the like, is stored.

Meanwhile, for easily searching for information and a file integrated with an image, the data managing unit 165 may support to assign file names for supporting an information search and for supporting an image search. Thus, when a user searches for a file stored in the camera DB 153 in future, searching for a file to which information is written may be supported to be performed in a manner of searching for information or searching for an image. For assigning a file name to support the information search, when text information is included in the corresponding information, the data managing unit 165 may extract a piece of information from the text information and control such that the extracted piece of information is automatically assigned as a file name. For assigning a file name for an image search support, the data managing unit 165 may perform an output of a pop-up window which inquires whether a file name is inputted in storing an image, and when there is no input, assign the same file name as that of the image search support. Also, the data managing unit 165 may control such that schedule information such as time information which is defined as a default is automatically written therein as a file name.

Figure 3:
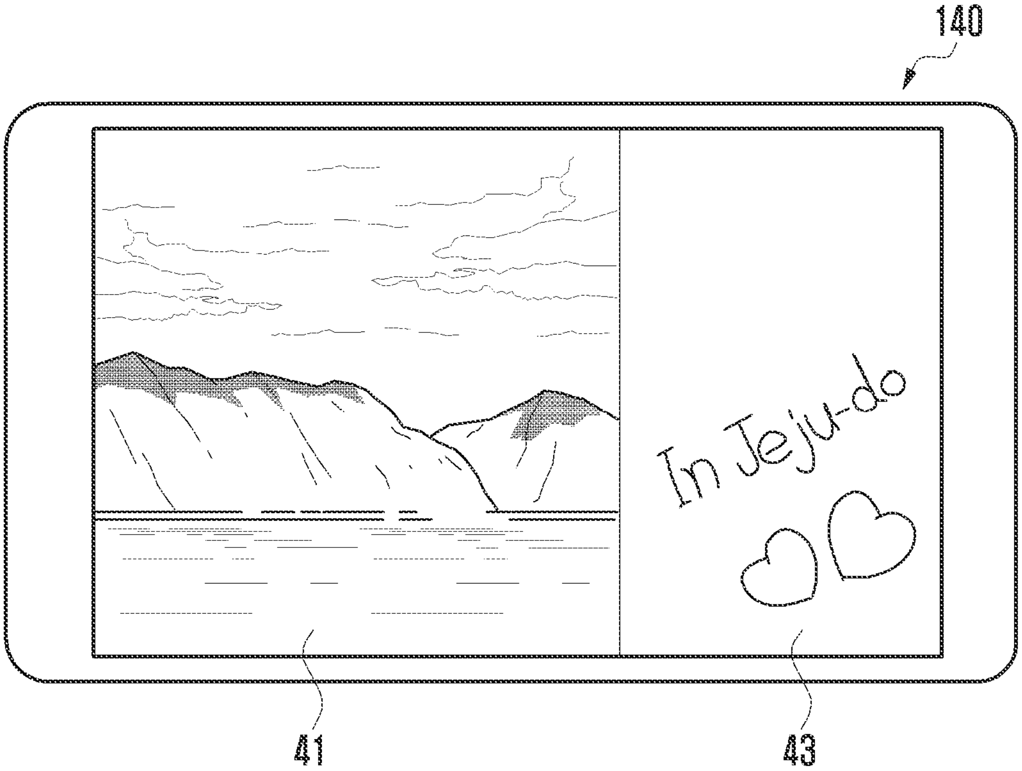
FIG. 3 is a view illustrating one example of a picture interface of supporting an information supplement function according to an exemplary embodiment of the present invention.

FIG. 3 is a view illustrating one example of a camera operating picture including an information supplement function according to an exemplary embodiment of the present invention.

Referring to FIG. 3, when after activating the terminal 100, a user generates an input signal for operating the camera module 170 and at the same time, calls the information supplement function, a picture may be output to the display unit 140, as shown. In a state of setting the terminal 100 into a landscape mode, a preview area 41 disposed at, for example, the left side as an area in which a preview image collected through the lens of the camera module 170 may be output. And, the information editing area 43 may be an area in which the information editor may be output by calling the information supplement function of the user and providing the default of the information supplement function of the terminal 100. In FIG. 3, the information editing picture according to a supporting of the drawing function of the functions of the information editor is shown in the information editing area 43. Thus, the user may draw a character, an image or the like using a touch function tool such as a stylus pen, a finger and the like on the information editing area 43. According to exemplary embodiments of the present invention, when lines corresponding to a specific character are input in the information editing picture of supporting a drawing function, the terminal 100 may scan corresponding lines, map the lines onto a character corresponding to the lines, and output the lines into the information editing area 43 as a preset specific character. To do this, the terminal 100 may further comprise a recognizing algorithm for recognizing a line as a character. In comparison of types of lines output to the information editing area 43 and characters previously defined, the recognizing algorithm may be an algorithm of mapping with a character corresponding to the number of edges, a bending angle, a continuous curvature and the like in a predetermined rate range.

Meanwhile, when specific information is input in the information editing area 43 and an image photographing area is generated, the terminal 100 may selectively control an image collecting type according to whether information which is written in the information editing area 43 exists. That is, if although the information editing area 43 is output, an image photographing signal is generated in a state in which specific information is not written, although the information editing area 43 is output, the terminal 100 may control such that the image output into the preview area 41 is only collected. This function may be equally applied to the information editing area output together with a photographed image area and an on-photographing area. That is, the terminal 100 may determine whether the information written in the information editing area at an image storing time point, when there is no written information, the terminal 100 may control such that images in the preview area, only the on-photographing area and the photographed image area is stored.

And, when an image photographing signal is generated in the state in which specific information is written in the information editing area 43, the terminal 100 may control such that images in the preview area 41 are collected and at the same time, the information output into the information editing area 43 is stored. At this time, the terminal 100 may store information of the preview area 41 and the information editing area 43 in a type that they are output on one screen. For example, the terminal 100 may capture a picture of the display unit 140 to which an image in the preview area 41 and information in the information editing area 43 are output and store it in an image type. Further, the terminal 100 may store the image in the preview area 41 and the information in the information editing area 43 to distinguish them from each other.

Here, when the drawing function is performed as mentioned above, the information editing area 43 may output a line or an image according to a touch event of a user. In this case, the terminal 100 may store information in the information editing area 43 in an image type. Further, when a character input function is performed, a key map may be output and a specific character or numeral may be output into the information editing area 43. In this case, the terminal may store the information output into the information editing area 43 as text information.

Figure 4:
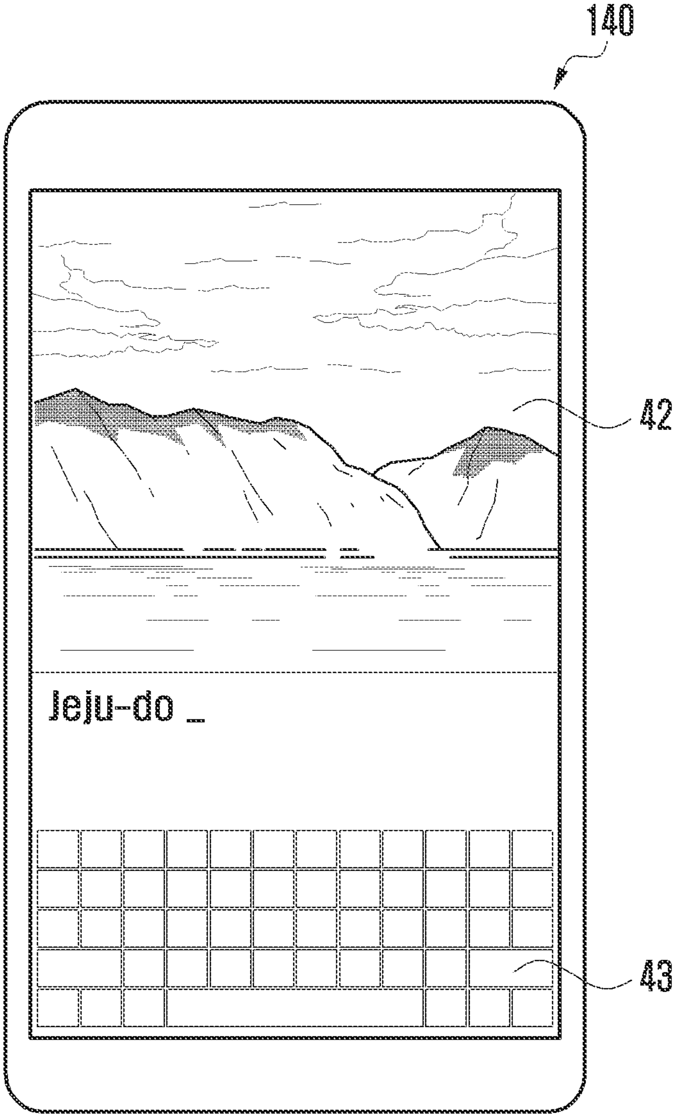
FIG. 4 is a view illustrating another example of a picture interface of supporting an information supplement function according to an exemplary embodiment of the present invention.

FIG. 4 is a view illustrating another example of a camera operating picture including an information supplement function according to an exemplary embodiment of the present invention.

Referring to FIG. 4, if the terminal 100 is disposed in a portrait mode, the photographed image area 42 is output at, for example, an upper portion of the screen and the information editing area 43 is output at, for example, a low portion of the screen. To do this, while operating the camera module 170, the terminal 100 may determine whether an input signal for photographing an object is generated. And, when the input signal for photographing the object is generated, the terminal 100 may support to photograph an image output on a preview screen and output it to the display unit 140. Then, when an input signal for calling the information supplement function or the information supplement function is set as a default function, as shown, the terminal 100 may support to dispose and output the photographed image area 42 and the information editing area 43 at an upper portion and a low portion thereof, respectively. Here, the photographed image area 42 may be disposed at an upper end of the information editing area 43. And, the information editing area 43 may include a key map area for supporting a character input function and an output area to which characters selected in the key map area are output is disposed at an upper end portion of the key map area. Thus, according to exemplary embodiments of the present invention, the terminal 100 may support to operate the information supplement function after photographing an object to enable, for example, users to write specific information to it.

Meanwhile, although in description of FIGS. 3 and 4 above, it has been described that a display area of the preview area 41 and the photographed image area 42 relatively larger than that of the information editing area 43, exemplary embodiments of the present invention are not limited to such configurations. That is, the preview area 41 and the photographed image area 42, and the information editing area 43 may operatively cut the display unit 140 in half and be set to have the same area. Further, as another example, the preview area 41 and the photographed image area 42 may be set to be relatively less than the information editing area 43.

Further, although in FIGS. 3 and 4, the preview area 41 and the photographed image area 42 have been described in a landscape mode and a portrait mode, respectively, exemplary embodiments of the present invention are not so limited. That is, when the mode of the terminal 100 is changed from landscape mode to the portrait mode in FIG. 3, similar to the arrangement in FIG. 4, the preview are 41 and the information editing area 43 may be respectively disposed at an upper end portion and a low end portion. Further, when the mode of the terminal 100 is changed from the portrait mode to the landscape mode in FIG. 4, the arrangement of the photographed image area 42 and the information editing area 43 may be changed into a type of arrangement such that the areas are respectively disposed at the left and right sides of the display unit 140.

In addition, an input scheme of the information editing area 43 may be changed according to the landscape and portrait modes. That is, the information editing area 43 may perform drawing function support in the landscape mode, and in the portrait mode, the editing area 43 provide character input and output functions based on the key map. As an example, the information editing area 43 may be set on the contrary to this according a user setting or the like. That is, the information editing area 43 may perform the drawing function support in the portrait mode and in the landscape mode, perform the character input and output function based on the key map. Further, when the mode of the information editing area 43 is changed from the landscape mode to the portrait mode or from the portrait mode to the landscape mode, the information supplement function may be switched from the drawing function to the character input and output function based on the key map or from the character input and output function based on the key map to the drawing function.

Further, in a state in which display unit 140 displays the preview area 41 and the information editing area 43, or displays the photographed image area 42 and the information editing area 43, a specific area may be removed from the display unit 140 according to a user request and a non-removed area may be output in a full screen type to the display unit 140.

Figure 5:
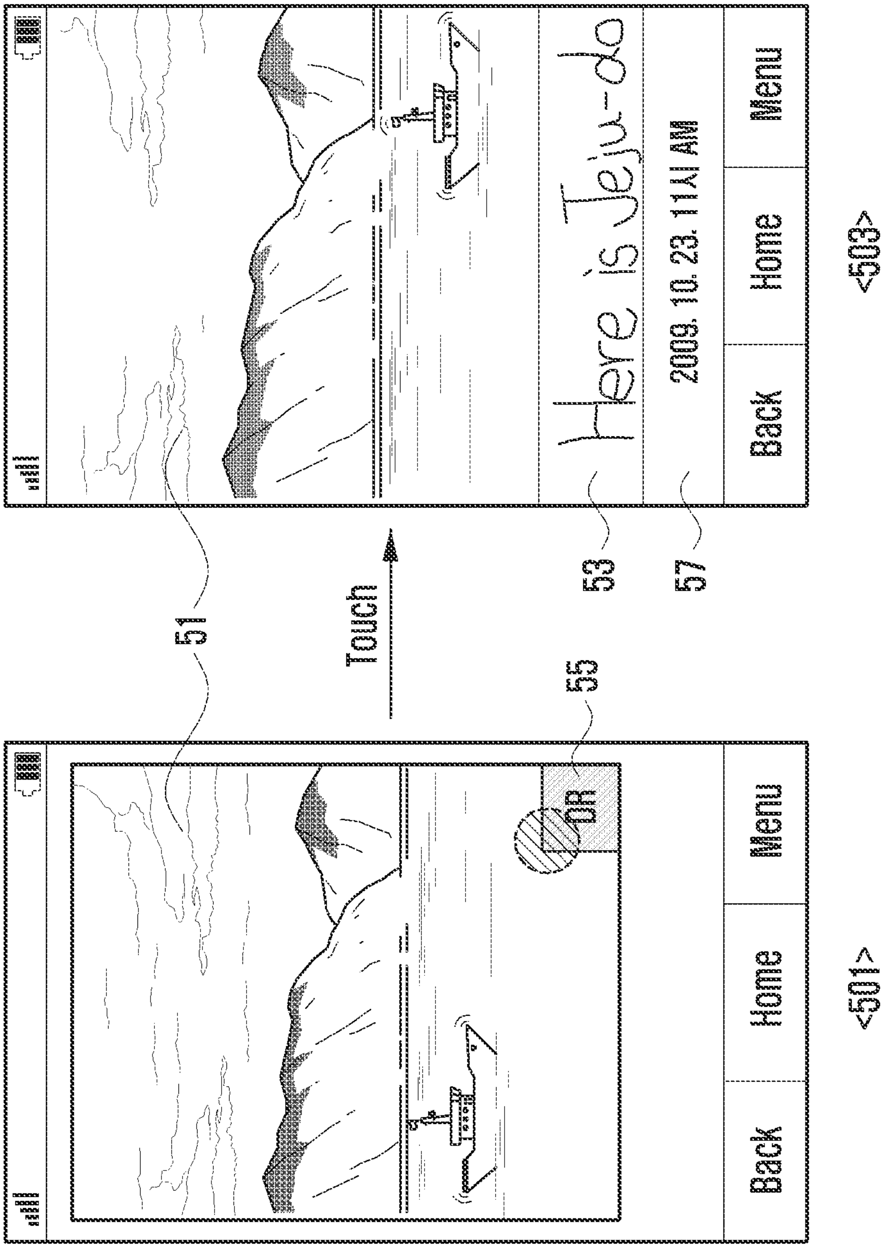
FIG. 5 is a view illustrating still another example of a picture interface of supporting an information supplement function according to an exemplary embodiment of the present invention.

FIG. 5 is a view illustrating still another example of a camera operating picture including an information supplement function according to an exemplary embodiment of the present invention.

Referring to FIG. 5, the terminal 100 may activate the camera module 170 according to a user request and perform an image photographing. Specifically, the terminal 100 may perform a photographing of a moving picture based on the camera module 170. While photographing a moving picture, the terminal 100 may support to output the on-photographing area 51 which is used for photographing the moving picture to the display unit 140 as a picture 501. At this time, the terminal 100 may output a menu or a function button 55 for calling the information supplement function to one side of the screen. In the depicted drawing, an outputting of a corresponding function button 55 is shown as one example. However, according to exemplary embodiments of the present invention, the function button 55 may be removed, and may be provided in a type of a hot key for calling the information supplement function or a specific menu.

Meanwhile, when the terminal is in a state in which the moving picture photographing area 51 is output to the display unit 140, a user generates a call of the information supplement function for example, a selection of the function button or an input signal corresponding to it, as in the picture 503, the terminal 100 may resize the moving picture photographing area 51 to reduce its size to a predetermined size and support to output the information area 53 to the reduced area. The user may write specific information in the information editing area 53. For example, the user may perform a touch operation on the information editing area 53 set by supporting the drawing function to write a specific character in it. As another example, the user may input information to the information editing area 53 via the input unit 120.

Meanwhile, when the information editing area 53 is output, the terminal 100 may support to automatically collect current time information and output the collected current time information to a time information area 57 provided at one side of the screen. Time information from output of the information editing area 53 until completion of the information editing area 53 may be recorded in the time information area 57. In the procedure of writing information in the information editing area 53 and storing it, the recorded time information may be stored together with it. When reproducing a corresponding image, the time information may used to output the information at the recorded time.

Meanwhile, in description of FIG. 5, it has been described that the information supplement function is called during a photographing of a moving picture, the present invention is not limited to it. That is, the terminal 100 of the present invention may output a moving picture preview area and the information editing area 53 before photographing a moving picture, such that the terminal 100 supports the information supplement function before photographing the moving picture. Further, after photographing a moving picture, the terminal 100 of the present invention may output the photographed image area and the information editing area 53 corresponding to a specific frame area of the moving picture, such that the terminal 100 supports the information supplement function after completing the photographing.

Figure 6:
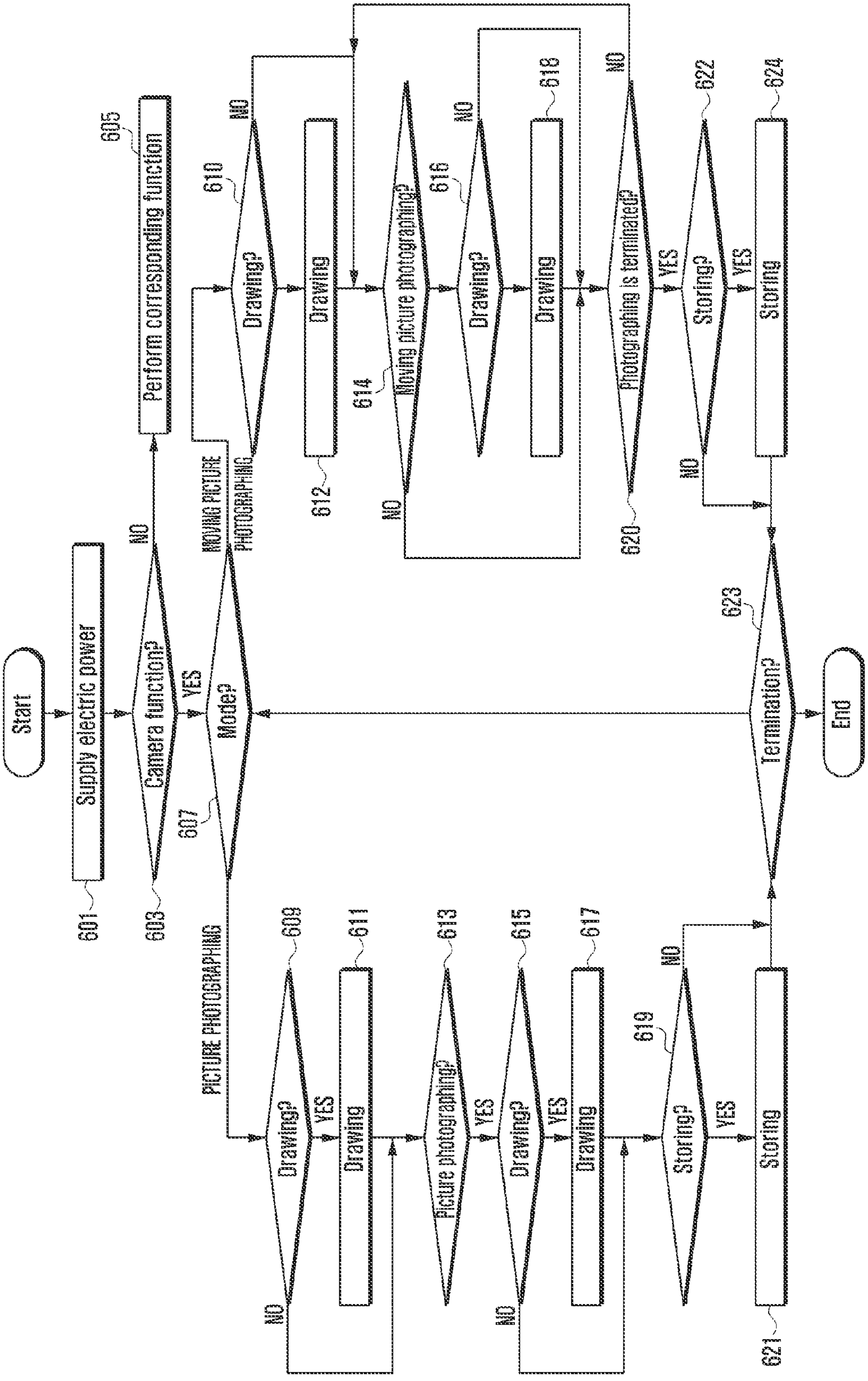
FIG. 6 is a flowchart illustrating a method of operating a terminal for supporting an information supplement function according to an exemplary embodiment of the present invention.

FIG. 6 is a flowchart illustrating a method of operating a camera which supports an information supplement function according to an exemplary embodiment of the present invention.

Referring to FIG. 6, in a method of operating a camera of the present invention, the controller 160 of the terminal 100 controls such that the supplied electric power is provided to each element at step 601. And when an input signal is generated, the terminal 160 may determine whether the input signal corresponds to a signal for activating the camera module 170 at step 603. When it is determined that the input signal does not correspond to a signal for activating the camera module 170, the controller 160 may support to perform a function, such as a file reproducing function, a web access function, a call function and the like, according to the input signal at step 605.

Meanwhile, when the input signal corresponds to a signal for activating the camera module 170, the controller 160 checks a mode input signal at step 607. When the mode of the terminal is determined to be a picture photographing mode for photographing a still image, the controller 160 may determine whether the information editing function such as the drawing function is called at step 609. When an input signal for calling the drawing function is generated at step 609, the controller 160 supports to perform the drawing function at step 611. That is, the controller 160 may support to input and output a line or an image according to a touch event generated in the display unit 140 of supporting a touch function. Meanwhile, when an input signal for calling the drawing function at step 609 does not exist or is not supported as a default, the controller may skip step 611. Then, the controller 160 may determine whether an input signal for photographing an image is generated at step 613. When the photographing is completed, the controller 160 determines whether an input signal corresponding to a signal for calling the drawing function is generated or a default is set at step 615. When the input signal corresponding to a signal for calling the drawing function is generated or the default is set, the controller 160 may support to the drawing function at step 617. When the calling of the drawing function does not occur at step 615, the controller 160 may skip step 617.

Then, the controller 160 determines whether an input signal corresponding to a signal for storing an image to which an image or information is written is generated at step 619. When the input signal for storing an image is generated at this step, a storing procedure may be performed at step 621. And, when the input signal for individually storing an image is not generated, the process may skip step 621 and go to step 623. The terminal 100 may determine whether an input signal corresponding to a signal for terminating a camera function is generated at step 623. Here, when the input signal for individually terminating a camera function is not generated, the process may go to step 607.

Meanwhile, when the moving picture photographing function is selected as a mode selecting signal, the controller 160 may prepare an operation of the camera module 170 to photograph a moving picture at step 607. And, when the moving picture photographing preparation is completed, the controller 160 may determine whether an event for calling the drawing function is generated before the moving picture photographing at step 610. When the event for calling the drawing function is generated at step 610, the drawing procedure may be performed at step 612. And, when the event for calling the drawing function is not generated at step 610, the controller 160 may skip step 612 and go to step 614.

The controller 160 determines whether an input signal corresponding to a signal for starting photographing a moving picture is input at step 614, and when the input signal corresponding to a signal for starting to photograph a moving picture is generated, the controller 160 determines whether an event for calling the drawing function is generated at step 616. When the event for calling the drawing function is generated at step 616, the information editing function is supported according to the calling of the drawing function at step 618.

Meanwhile, after stating to photograph the moving picture, the controller 160 skips steps 616 and 618, and the controller 160 may determine whether an input signal corresponding to a signal for terminating the photographing of the moving picture is generated at step 620. When the event for calling the drawing function is not generated at step 616, the controller 160 skips step 618 and the process goes to step 620.

When the input signal for terminating the moving picture photographing is generated at step 620, the controller 160 determines whether an input signal corresponding to a signal for storing is generated at step 622. And, when the input signal corresponding to a signal for storing is generated, the controller 160 may control such that the photographed moving picture or a moving picture to which information is written is controlled at step 624. Then, the controller 160 may go to step 623.

In the description above, exemplary embodiments of the present invention has been described with reference to the drawing function as the information editing function. However, the method for operating a camera according to exemplary embodiments of the present invention is not limited to the example in which the information editing function corresponds to the drawing function. That is, as mentioned above, the drawing function may be substituted or switched with or to the character input and output function based on the key map according to a user selection, a terminal 100 disposed state and a default setting.

For example, the terminal 100 of the present invention may identify a state of the terminal 100, and when the mode of the terminal 100 is the landscape mode, support to output the information editing area of the drawing function supporting or the character input and output function based on the key map. Further, when the mode of the terminal 100 is the portrait mode, the terminal 100 according to exemplary embodiments of the present invention may support to output the information editing area of the information editing support of the character input and output function based on the key map or the drawing function support.

Further, the terminal 100 according to exemplary embodiments of the present invention may determine whether the state of the terminal 100 is changed, and the terminal 100 may control the information editing area to be changed from the drawing function support to the key map-based character input and output function support when the mode of the terminal is changed from the landscape mode to the portrait mode, or the terminal 100 may control the information editing area to be changed from the drawing function support to the key map-based character input and output function support when the mode of the terminal is changed from the portrait mode to the landscape mode. Further, the terminal 100 may control the information editing area to be changed from the key map-based character input and output function support to the drawing function support when the mode of the terminal is changed from the landscape mode to the portrait mode, or the terminal 100 may control the information editing area to be changed from the key map-based character input and output function support to the drawing function support when the mode of the terminal is changed from the portrait mode to the landscape mode.

Figure 7:
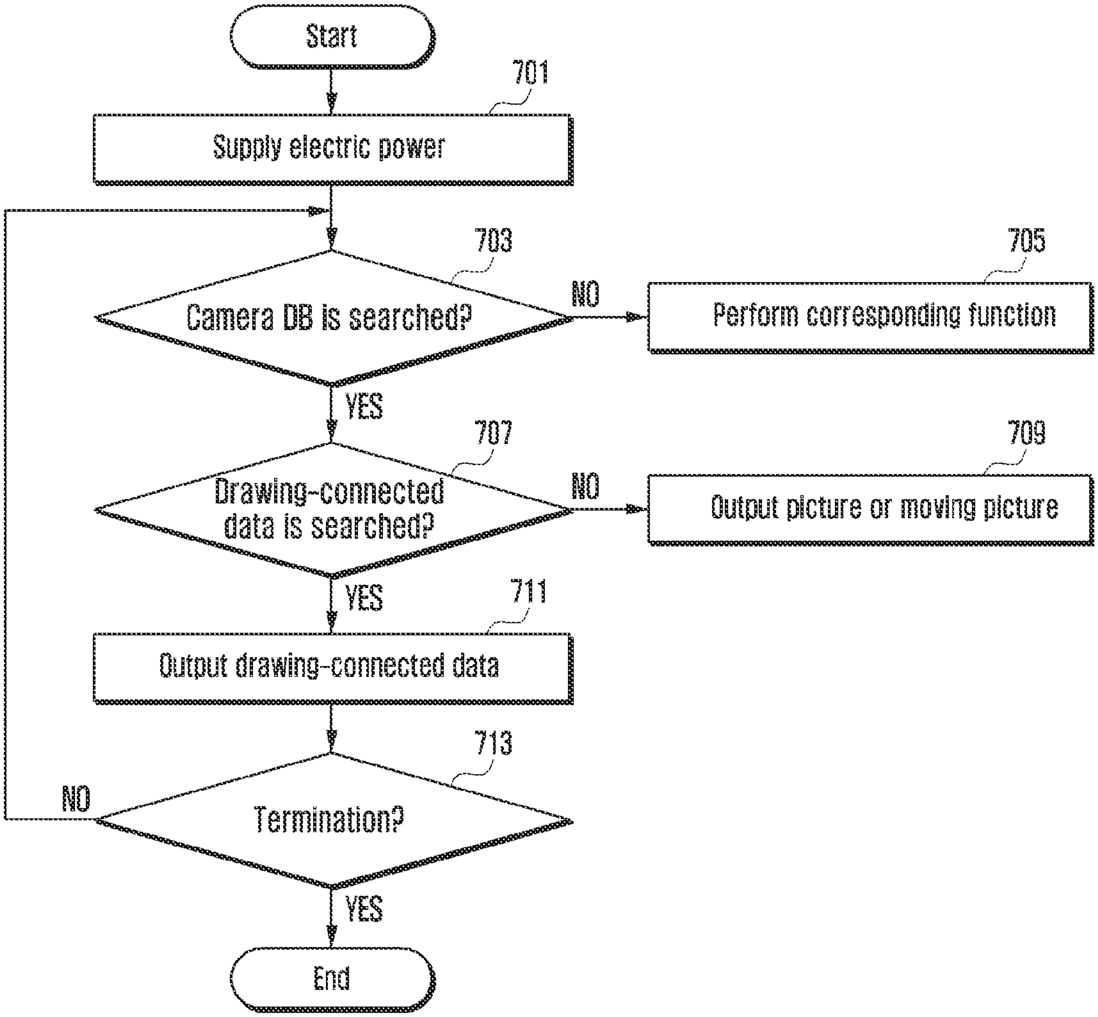
FIG. 7 is a flowchart illustrating a method of searching for data to which information is written according to an exemplary embodiment of the present invention.

FIG. 7 is a flowchart illustrating a method of searching for an image to which information is written according to an exemplary embodiment of the present invention.

Referring to FIG. 7, the controller 160 of the terminal 100 may generate electric power necessary for operating each element using an electric power supplied from an electric power source and provide the electric power to each element at step 701.

Then, the controller 160 may determine whether an input signal corresponding to a signal for searching camera DB 153 is generated at step 703. When the input signal does not correspond to a signal for searching the camera DB 153, the method of searching for an image proceeds to step 705 at which the controller 160 may support to perform a function according to corresponding input signal such as a call function, a file reproducing function, a web access function, a broadcasting receiving function, and the like, according to whether the terminal supports such a function.

Meanwhile, when an input signal corresponding to a signal for searching the camera DB 153 is generated at step 703, the method of searching for an image proceeds to step 707 at which the controller 160 may determine whether the corresponding signal is an input signal for searching for drawing-connected data. Here, the drawing-connected data may mean specific data to which drawing information of data which is written into a specific image is written. As illustrated in FIG. 6, because an information editor according to exemplary embodiments of the present invention may support the drawing function, image data into which drawing information is written may be stored in the camera DB 153. According to exemplary embodiments of the present invention, data stored in the camera DB 153 is not limited to the drawing-connected data. That is, in an image into which information of the present invention is written, the information may include text information. To do this, as illustrated in FIG. 4, the character editor of the character input and output function including the key map may be provided as an information editor.

Meanwhile, at step 707, when the input signal corresponds to a signal for searching for a picture or a moving picture to which normal data in which specific information is not written, the controller 160 may support to output a picture or a moving picture according to the corresponding input signal at step 709.

And, at step 707, when the input signal corresponds to a signal for searching for connected data, the controller 160 may support to output the drawing-connected data to the display unit 140 at step 711. At this time, when the drawing-connected data is output, the controller 160 may support various types of outputs according to data characteristic. For example, the controller 160 may support to simultaneously output a picture and information on one screen of the display unit 140 when searching for the picture into which the information is written. To do this, the controller 160 may divide the screen of the display unit 140 or assign a specific area, and support to distinguish the information and the picture image from each other and output the information and the picture image to the divided screen or the distinguished screen according to the assignment. Further, when after photographing and before storing a picture, information is written into the picture, although the controller 160 outputs the picture image and the information as a full screen image, the controller 160 may output the information and the picture image at intervals according to a toggle type to the display unit 140.

Meanwhile, when an input signal corresponding to a signal for searching for data into which information is written while photographing a moving picture, the controller 160 collects time information about the written information while photographing the moving picture. And, the controller may support to output corresponding information corresponding to the collected time information while reproducing the moving picture. Thus, searching for a specific moving picture when searching for data, a user may more thoroughly identify which information is written at a certain time point. And, a user may more easily perform a data searching according thereto.

At step 713, the terminal queries the user whether the method of searching for an image should be terminated. If the user indicates that the method should be terminated, then the method ends. Otherwise, if the user indicates that the method should not be terminated, then the method returns to step 703.

As described above, a method of operating a camera including an information supplement function and a terminal of supporting the same support to write specific information which a user desires at least one time point of before, during and after an image photographing, when performing various types of information edit while photographing a picture or a moving picture. Thus, although exemplary embodiments of the present invention not only store simply a image, but also supplements information which a user desires to add while operating a camera, exemplary embodiments of the present invention may support to write the information in more various and easy scheme.

As described above, according to a method of operating a camera including an information supplement function and a terminal of supporting the same according to exemplary embodiments of the present invention, the exemplary embodiments of the present invention allows a user to more easily and quickly perform a writing of a type of information desired by a user while operating a camera. Further, exemplary embodiments of the present invention may perform more easily and quickly identifying of information which is written during a procedure of searching an information written image.

While of the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a camera module in a terminal, the method comprising:

activating the camera module;

outputting, on a display unit, an information editing area having an information supplement function together with an image area, the image area including at least one of a preview area for outputting a preview image, a photographed image area according to completion of photographing, and an on-photographing area according to a state of on-photographing during operation of the camera module;

detecting an input for information in the information editing area;

storing data into which information inputted in the information editing area and at least one of a still image and a moving image displayed on the image area are integrated; and displaying, if an input for searching an output data of the stored data is detected, an output item corresponding to the output data.

2. The method of claim 1, wherein the outputting to the display unit comprises:

dividing a screen of the display unit;

outputting one of the preview area, the photographed image area, and the on-photographing area to one division of the screen; and outputting the information editing area to another division of the screen.

3. The method of claim 1, wherein the outputting to the display unit comprises:

outputting at least one of the preview area, the photographed image area, and the on-photographing area;

assigning a predetermined area to each of the preview area, the photographed image area, and the on-photographing area; and outputting the information editing area to the assigned areas such that the assigned areas are overlaid with the information editing area.

4. The method of claim 1, wherein the outputting of the information editing area to the display unit comprises:

outputting the information editing area for supporting a drawing function by which a line or an image is able to be written according to a touch event.

5. The method of claim 4, further comprising:

determining a state of the terminal;

when the state of the terminal is in a landscape mode, outputting the information editing area for supporting the drawing function.

6. The method of claim 4, further comprising:

determining a change in a state of the terminal; and performing one of:

when the state of the terminal is changed from a landscape mode to a portrait mode, changing the information editing area for supporting the drawing function into the information editing area for supporting a character input and output function based on a key map;

when the state of the terminal is changed from the portrait mode to the landscape mode, changing the information editing area for supporting the drawing function into the information editing area for supporting the character input and output function based on the key map;

when the state of the terminal is changed from a landscape mode to a portrait mode, changing from the information editing area for supporting the character input and output function based on the key map into the information editing area for supporting the drawing function; and when the state of the terminal is changed from the portrait mode to the landscape mode, changing from the information editing area for supporting the character input and output function based on the key map into the information editing area for supporting the drawing function.

7. The method of claim 1, wherein the storing of the data into which information written in the information editing area and at least one of the picture and the moving picture are integrated comprises:

storing time information according to writing of information during one of before photographing a moving picture, when photographing for the moving picture is completed, and when the moving picture is being photographed.

8. The method of claim 1, further comprising:

adjusting an output time point of the written information based on time information according to the searching request while the moving picture is reproduced.

9. The method of claim 1, further comprising:

determining whether the information editing area includes written information; and storing, when the information editing area does not include written information, only an area after photographing completion, an on-photographing area, and one of a picture and a moving picture in a preview area.

10. A terminal for supporting an information supplement function while operating a camera module, the terminal comprising:

the camera module configured to photograph at least one of a still image and a moving image;

a display unit configured to output an information editing area having an information supplement function together with an image area, the image area including at least one of a preview area for outputting the preview image, a photographed image area according to completion of photographing an on-photographing area according to a state of on-photographing of at least one of time points when a preview image of an object for photographing at least one of a picture and a moving picture by the activated camera module is output, when photographing for at least one of a picture and a moving picture is complete, and when a moving picture is being photographed;

a memory; and a controller configured to:

simultaneously output the information editing area together with at least one of the preview area, the on-photographing area and the photographed image area;

detect an input for information in the information editing area, control the memory to store data into which information inputted in the information editing area and at least one of a still image and a moving image displayed on the image area are integrated, and if an input for searching an output data of the stored data is detected, display an output item corresponding to the output data.

11. The terminal of claim 10, wherein the controller is configured to control the terminal such that a screen of the display unit is divided, one of the preview area, the photographed image area, and the on-photographing area is output to one division of the screen, and wherein the information editing area is output to another division of the screen.

12. The terminal of claim 10, wherein the information editing area comprises one of an information editing area for supporting a drawing function by which at least one of a line and an image is able to be written according to a touch event.

13. The terminal of claim 12, further comprising:

a sensor configured to determine whether the terminal is configured in a landscape mode or a portrait mode.

14. The terminal of claim 13, wherein the controller is configured to control the terminal such that when a state of the terminal is in the landscape mode, the information editing area for supporting the drawing function is output.

15. The terminal of claim 10, wherein the controller is configured to:

control the terminal such that the terminal stores time information according to writing of information during at least one of before photographing a moving picture, when a photographing for a moving picture is completed, and when a moving picture is being photographed, wherein when a specific moving picture in which information is written according to generation of an input signal for searching for the stored data, control the terminal such that the specific moving picture is reproduced, and wherein while the specific moving picture is reproduced, adjust an output time point of the written information based on the time information.

16. The terminal of claim 10, wherein the controller is configured to:

determine whether the information editing area includes written information, and when the terminal is storing an image collected by the camera module, the information editing area is for supporting a drawing function, and control the terminal such that information in the information editing area is stored in an image type together with one of the picture and the moving picture.

17. The method of claim 1, wherein the outputting to the display unit comprises:

outputting to the display unit, the information editing area together with at least one of the preview area, the photographed image area, and the on-photographing area of at least one of time points when a preview image of an object for photographing at least one of a picture and a moving picture by the activated camera module is output, when a photographing for one of a picture and a moving picture is complete, and when a moving picture is being photographed.

18. The method of claim 4, wherein the outputting of the information editing area to the display unit further comprises:

outputting the information editing area for supporting a character input and output function based on a key map which outputs a character corresponding to a key selected based on the key map.

* * * * *